(12) United States Patent
Bolle

(10) Patent No.: US 6,966,121 B2
(45) Date of Patent: Nov. 22, 2005

(54) EXTERNAL GAUGE FOR LIQUOR INVENTORY CONTROL

(76) Inventor: Barbara J. Bolle, P.O. Box 153, Champion, MI (US) 49814

( * ) Notice: Subject to any disclaimer, the term of this patent is extended or adjusted under 35 U.S.C. 154(b) by 176 days.

(21) Appl. No.: 10/014,838

(22) Filed: Oct. 26, 2001

(65) Prior Publication Data

US 2002/0095806 A1    Jul. 25, 2002

Related U.S. Application Data

(63) Continuation of application No. 09/369,758, filed on Aug. 6, 1999, now abandoned.

(60) Provisional application No. 60/095,554, filed on Aug. 6, 1998.

(51) Int. Cl.[7] ............................................. G01F 17/00
(52) U.S. Cl. .............................. 33/494; 33/1 V; 33/522
(58) Field of Search .......................... 33/494, 1 V, 483, 33/492, 522, 524, 679.1, 719, 721, 722, 729, 33/562, 563, 758

(56) References Cited

U.S. PATENT DOCUMENTS

| | | | | |
|---|---|---|---|---|
| 62,866 A | * | 3/1867 | McCann | 33/721 |
| 645,875 A | * | 3/1900 | Strauss | 33/721 |
| 765,611 A | * | 7/1904 | Carr | 33/721 |
| 1,235,801 A | * | 8/1917 | Hornig | 33/494 |
| 1,469,944 A | * | 10/1923 | Merrill | 33/494 |
| 1,515,398 A | * | 11/1924 | Marcussen | 33/524 |
| 1,589,651 A | * | 6/1926 | McDermott | 33/494 |
| 1,754,903 A | * | 4/1930 | Nearing | 33/494 |
| 2,507,684 A | * | 5/1950 | Smith | 33/758 |
| 4,358,958 A | * | 11/1982 | Wehrenberg | 73/428 |

FOREIGN PATENT DOCUMENTS

| | | | | | |
|---|---|---|---|---|---|
| GB | 2169876 A | * | 7/1986 | | G01F 11/32 |
| GB | 2180648 A | * | 4/1987 | | G01F 17/00 |
| GB | 2283097 A | * | 4/1995 | | G01B 03/04 |

* cited by examiner

Primary Examiner—Christopher W. Fulton
(74) Attorney, Agent, or Firm—James M. Deimen

(57) ABSTRACT

A plurality of two-dimensional template-shaped gauges to quickly determine the amount of liquor poured from a corresponding bottle. Since each style of gauge fits a complementary bottle style, the ounce, shot or metric vertical markings on the gauge can be spaced to reflect the change in bottle cross-section. A bartender or server can quickly, literally at a glance, determine the amount remaining in the bottle. The result is a more accurate pour and better control over the sales of expensive liquor and similar beverages. The new gauges are reusable an indefinite number of times depending on the plastic or other material from which they are constructed. Moreover, the new gauges are ideal for displaying brand names and logos. The template shapes may be formed on both side edges of each gauge, therefore each gauge can be used with two bottles of differing shape.

1 Claim, 3 Drawing Sheets

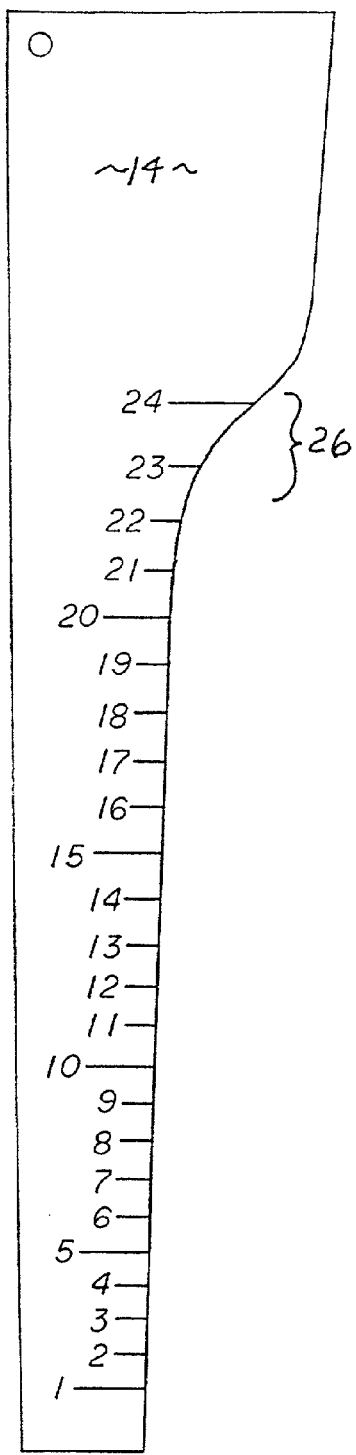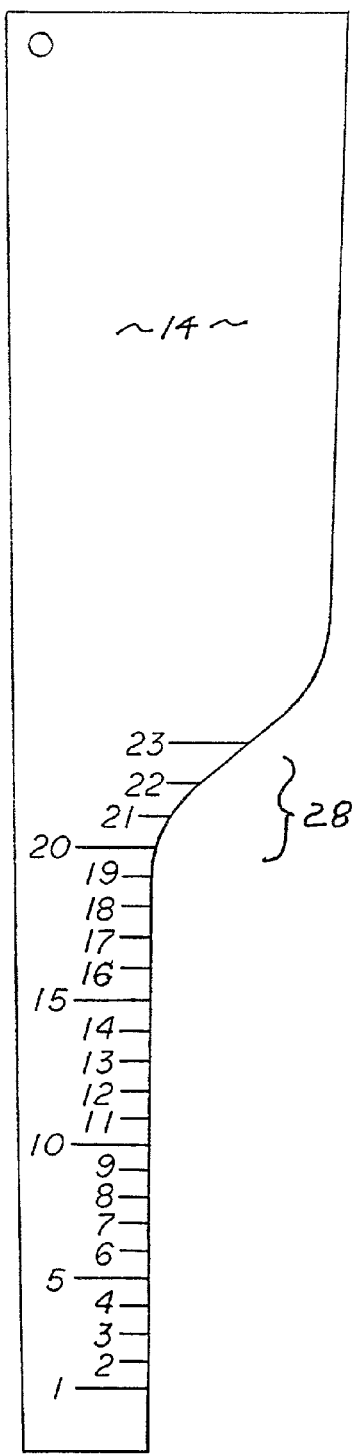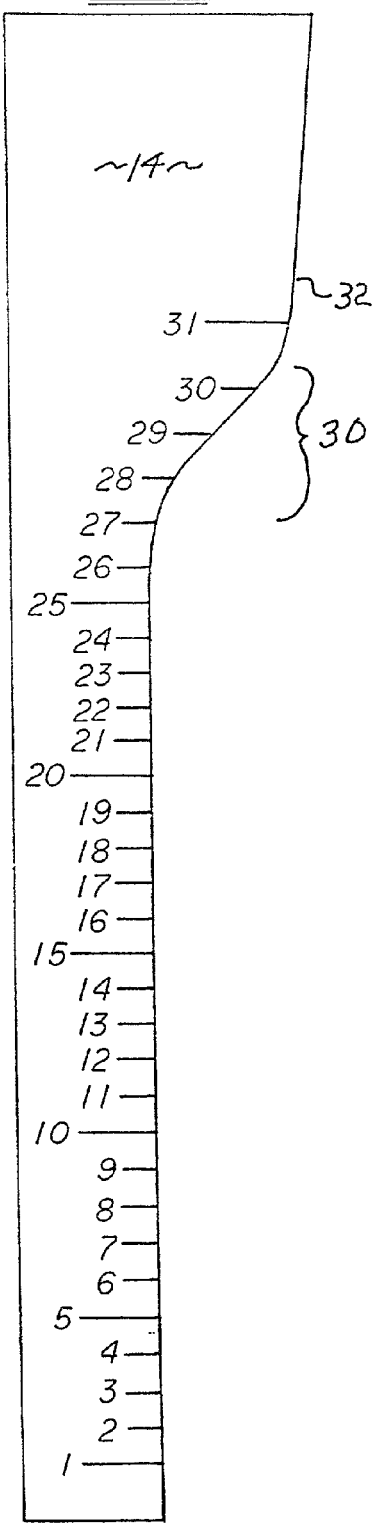

EXTERNAL GAUGE FOR LIQUOR INVENTORY CONTROL

BACKGROUND OF THE INVENTION

This application is a continuation of application Ser. No. 09/369,758, filed Aug. 6, 1999, now abandoned, and claims the benefit of provisional patent application No. 60/095,554 filed Aug. 6, 1998.

The field of the invention pertains to measuring devices for determining the quantity of liquid in a bottle, or removed from a bottle and, in particular, the quantity removed from bottles of peculiar or fancy shape such as liquor bottles.

Many bottles, particularly in the bottled spirits market, are manufactured with a unique distinctive shape which serves as readily identifiable trademark or tradedress for the contents. As a result, the horizontal cross-sectional area of the bottle may vary significantly as a function of bottle height measured from the bottom or top of the bottle. Although vertical scales have been molded into bottles or adhered to the bottle exterior, such scales are inaccurate unless they take into account the varying cross-section of the bottle. Moreover, molded-in scales are very difficult to read at a glance when a part of dark but transparent liquor bottles.

SUMMARY OF THE INVENTION

The invention comprises two-dimensional template-shaped gauges to quickly determine the amount of liquor poured from a corresponding bottle. Since each style of gauge fits a complementary bottle style, the ounce, shot or metric vertical markings on the gauge can be spaced to reflect the change in bottle cross-section. A bartender or server can quickly, literally at a glance, determine the amount remaining in the bottle. The result is a more accurate pour and better control over the sales of expensive liquor and similar beverages.

The new gauge is reusable an indefinite number of times depending on the plastic or other material from which it is constructed. Moreover, the new gauge is ideal for displaying brand names and logos, or public interest and educational messages. The template shape may be formed on one or both side edges, therefore the same gauge can be used with two bottles of differing shape.

BRIEF DESCRIPTION OF THE DRAWINGS.

FIG. 3 illustrates the gauge for a fifth of a common brand;

FIG. 4 illustrates the gauge for a fancy cordial of a particular brand;

FIG. 5 illustrates the gauge for a liter bottle of a particular brand; and

DESCRIPTION OF THE PREFERRED EMBODIMENTS

Figure 1:
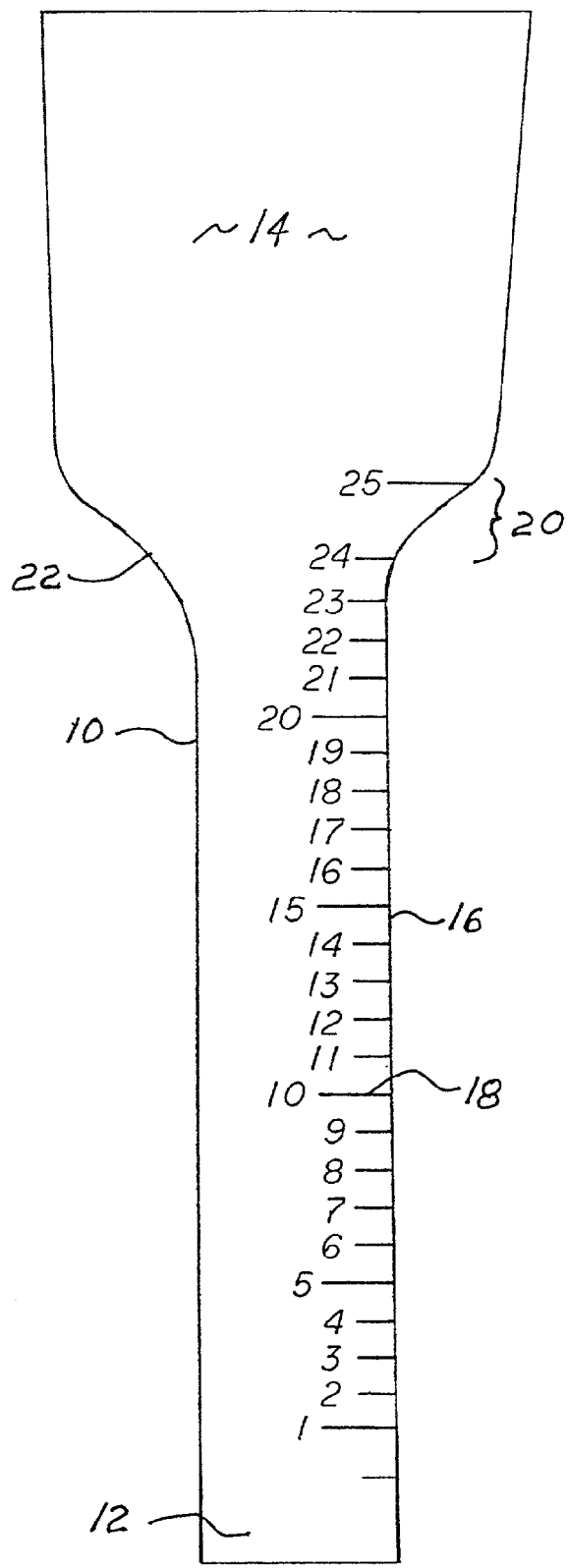
FIG. 1 illustrates the basic double edge gauge in side view.

FIGS. 1 through 5 illustrate five differing shapes for the inventory control gauges. In FIG. 1, the gauge comprises a flat piece of plastic 10 having a bottom 12 and a larger top area 14. The right hand edge 16 has a scale 18 printed on the gauge 10. The scale 18 follows the edge 16 curvature as shown, the curvature in turn is shaped to complement the outside wall of a bottle of matching shape. The bottle of matching shape is typically of a particular brand of alcoholic beverage served in a bar or restaurant. The larger top area 14 serves as a flag area for the logo corresponding to the beverage dispensed from the bottle. The logo serves as a means for instant recognition of the correct gauge to use by a server or bartender. The logo encourages use of the gauge in measuring each pour. Better control of dispensing and the inventory of each beverage is accomplished.

The spacing of the ounce or shot marks of the gauge is determined by the cross-section of the bottle interior adjusted for changing cross-section from the mark therebelow to assure that accurate ounces or shots are dispensed. As shown in the figures, the scales are in ounces. Where the change in bottle cross-section is pronounced as at 20 in FIG. 1, the change in spacing is readily apparent.

As shown in FIG. 1, the left hand edge 22 is also shaped but to a different curvature. On the back of the plastic piece 10 is a second scale for the left hand edge 22. A second logo can be placed on the larger top area 14 of the back to correspond with the bottle complementary to the left hand edge 22.

Figure 2:
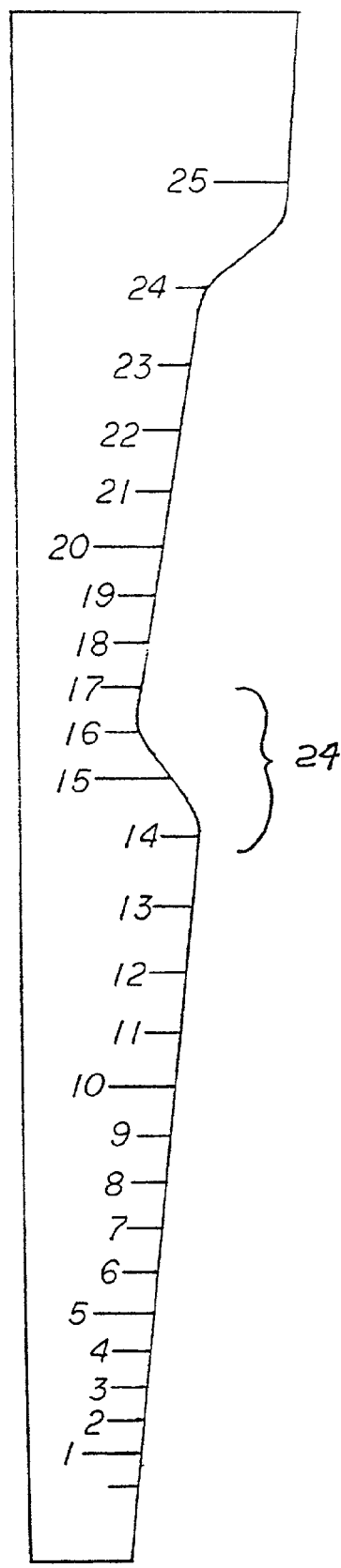
FIG. 2 illustrates a single edge gauge for a unique bottle or a particular brand.

FIG. 2 illustrates a gauge for a particular brand with a very recognizable bottle shape. Readily apparent is the continuously changing scale spacing at 24 in proportion to the changing cross-sectional area of the bottle interior.

FIG. 3 illustrates a gauge for a fifth of liquor of a common brand. At the shoulder of the bottle as shown by the gauge at 26, the cross-sectional area of the bottle significantly changes.

FIG. 4 illustrates a gauge for a fancy cordial of a particular brand. In contrast to FIG. 3, the change in scale at the shoulder 28 is relatively small because the bottle is non-circular and the change in cross-section is less than the shoulder would otherwise indicate.

FIG. 5 illustrates a gauge for a liter of a particular brand. This bottle is normally filled to just above the shoulder 30 and into the neck 32 as indicated at the top of the scale. Here the spacing between ounce marks is significantly increased.

Figure 6:
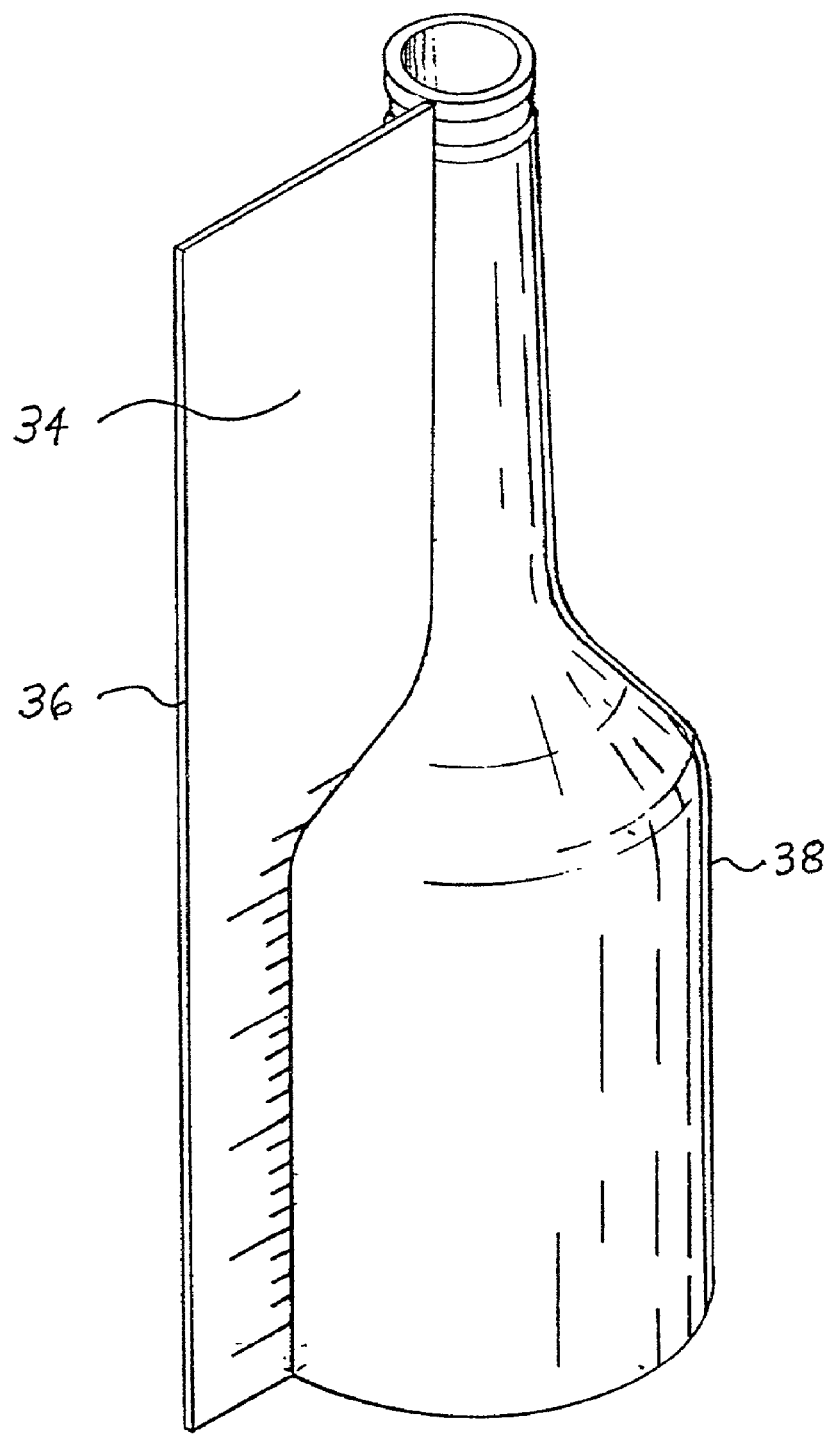
FIG. 6 is a perspective illustrating the gauge applied to a bottle.

The appropriate gauge as indicated by the logo on the flag portion 34 of the gauge 36 shown in FIG. 6 is selected and applied to the bottle 38 to measure the pour. Thus, the contents in the bottle 38 can be easily measured by a scale unique to the bottle and brand thereon. And, as a result, control over the amount dispensed and the inventory remaining is more accurately determined.

Moreover, the logos on the gauges encourage the sales of brands identified on the gauges in contrast to brands lacking the gauges.

What is claimed is:

1. A gauge having at least two edges, a top and a bottom, at least one of the edges shaped to engage and match the corresponding external surface of a bottle in a direction parallel to the bottle axis, said at least one edge extending from the outside bottom of the corresponding bottle, a scale extending along the shaped edge, said scale having spacing changing as a function of the change in cross-sectional area of the bottle interior in the direction of the bottle axis, said scale beginning or ending measurement with the bottom of the bottle interior, and said two edges being shaped to engage and match the external surfaces of dissimilar bottles parallel to the bottle axes, the two edges being of dissimilar curved shapes.

* * * * *